US011710047B2

(12) United States Patent
Abolhassani et al.

(10) Patent No.: US 11,710,047 B2
(45) Date of Patent: Jul. 25, 2023

(54) COMPLEX SYSTEM FOR META-GRAPH FACILITATED EVENT-ACTION PAIRING

(71) Applicant: Accenture Global Solutions Limited, Dublin (IE)

(72) Inventors: Neda Abolhassani, San Mateo, CA (US); Teresa Sheausan Tung, Tustin, CA (US); Mohamad Mehdi Nasr-Azadani, San Francisco, CA (US); Sonali Parthasarathy, Fremont, CA (US); Reymonrod Geli Vasquez, Vallejo, CA (US); Colin Anil Puri, Walnut Creek, CA (US); Mark Joseph Portelli, London (GB); Jonathan Tipper, London (GB)

(73) Assignee: Accenture Global Solutions Limited, Dublin (IE)

( * ) Notice: Subject to any disclaimer, the term of this patent is extended or adjusted under 35 U.S.C. 154(b) by 425 days.

(21) Appl. No.: 17/097,396

(22) Filed: Nov. 13, 2020

(65) Prior Publication Data

US 2021/0149748 A1    May 20, 2021

Related U.S. Application Data

(60) Provisional application No. 62/935,956, filed on Nov. 15, 2019.

(51) Int. Cl.
*G06F 9/44* (2018.01)
*G06N 5/02* (2023.01)
*G06F 9/54* (2006.01)
*G06F 18/22* (2023.01)
*G06F 18/20* (2023.01)
*G06F 18/211* (2023.01)
*G06F 18/25* (2023.01)

(52) U.S. Cl.
CPC ............... *G06N 5/02* (2013.01); *G06F 9/542* (2013.01); *G06F 18/211* (2023.01); *G06F 18/22* (2023.01); *G06F 18/251* (2023.01); *G06F 18/29* (2023.01)

(58) Field of Classification Search
CPC ....................................................... G06N 5/02
USPC ....................................................... 719/318
See application file for complete search history.

(56) References Cited

U.S. PATENT DOCUMENTS

| | | | |
|---|---|---|---|
| 2011/0265011 A1* | 10/2011 | Taylor ................... | G06F 40/221 715/751 |
| 2017/0111245 A1* | 4/2017 | Ishakian ............ | G06Q 10/0633 |
| 2018/0150757 A1* | 5/2018 | Aggarwal .............. | G06N 20/00 |
| 2021/0012216 A1* | 1/2021 | Giovannini ............ | G06V 20/42 |

OTHER PUBLICATIONS

Zhao, et al., "Meta-graph based recommendation fusion over heterogeneous information networks," Proceedings of the 23rd ACM SIGKDD International Conference on Knowledge Discovery and Data Mining, pp. 635-644. ACM, 2017.

(Continued)

*Primary Examiner* — Timothy A Mudrick
(74) *Attorney, Agent, or Firm* — Crowell & Moring LLP

(57) ABSTRACT

A system maintains a knowledge layout to support the building of event response recommendations. Meta-graph patterns may be used to determine semantic relatedness between events and actions in response. Event-action node pairs are then constructed.

20 Claims, 5 Drawing Sheets

(56) References Cited

OTHER PUBLICATIONS

Cao, et al., "Meta-path-based link prediction in schema-rich heterogeneous information network," International Journal of Data Science and Analytics 3.4 (2017): 285-296.

Meng, et al., "Discovering meta-paths in large heterogeneous information networks," Proceedings of the 24$^{th}$ International Conference on the World Wide Web, International World Wide Web Conferences Steering Committee, 2015.

* cited by examiner

US 11,710,047 B2

COMPLEX SYSTEM FOR META-GRAPH FACILITATED EVENT-ACTION PAIRING

PRIORITY

This application claims priority to U.S. Provisional Patent Application No. 62/935,956, filed Nov. 15, 2019, bearing Attorney Docket No. 15718-676, and titled Complex System for Meta-Graph Facilitated Event-Action Pairing, which is incorporated by reference in its entirety.

TECHNICAL FIELD

This disclosure relates to meta-graph-facilitated event-action pairing.

BACKGROUND

Rapid advances in electronics and communication technologies, driven by immense customer demand, have resulted in the widespread adoption of communication technology supported services. As one example, communications-based tracking and support of delivery logistics has transformed the commercial parcel delivery service marketplace. Improvements in the integration of communication-based technologies into service support will continue to increase the features and options available to service customers and providers of services.

DETAILED DESCRIPTION

The various techniques and architectures described below implement knowledge layouts (e.g., a knowledge graph, resource description framework, or other schematic mapping of resources) to build event and analytical models in parity as descriptors (e.g., for data, resources, analytics model templates, parties, events, or other descriptor targets) are onboarded into the knowledge layout. The event models provide a data snapshot of the conditions and available resources (including, for example, technical machine and computing resources) for response to those conditions. Analytical models may be used to select actions for response to identified sets of conditions (e.g., events).

In some cases, through various data input pathways managed by input layer controlled circuitry, a system may determine a set of conditions making up an event may be present. For example, a pre-defined set or dynamically identified set of conditions making up an event may be detected. Based on the detection of the set of conditions, the system may determine that an event is occurring. Responsive to the event, the system may determine to respond (e.g., to resolve or mitigate the event, or, in some cases, positively feedback to amplify expected desirable outcomes associated with the event). In some cases, the system may implement a compulsory condition forcing continued actions in response to the event until a successful action (e.g., meeting a determined goal condition, changing the detected conditions such that the event no longer applies, or other success outcome).

To treat data sparsity, scarcity, and non-trivial relationships, meta-graphs may be used. Using meta-graph patterns defined on the knowledge graph schema, the system can recommend actions based on the semantic relatedness of the various events and actions. The recommendations results selected (e.g., by the end-user) and the meta-graphs (e.g., those evaluated by domain experts) are automatically graded during the entire lifecycle of the system for transfer learning reliability, evaluation, and reproducibility. Thus, the reliability and reproducibility (in different environments) of the underlying hardware is improved.

Figure 1:
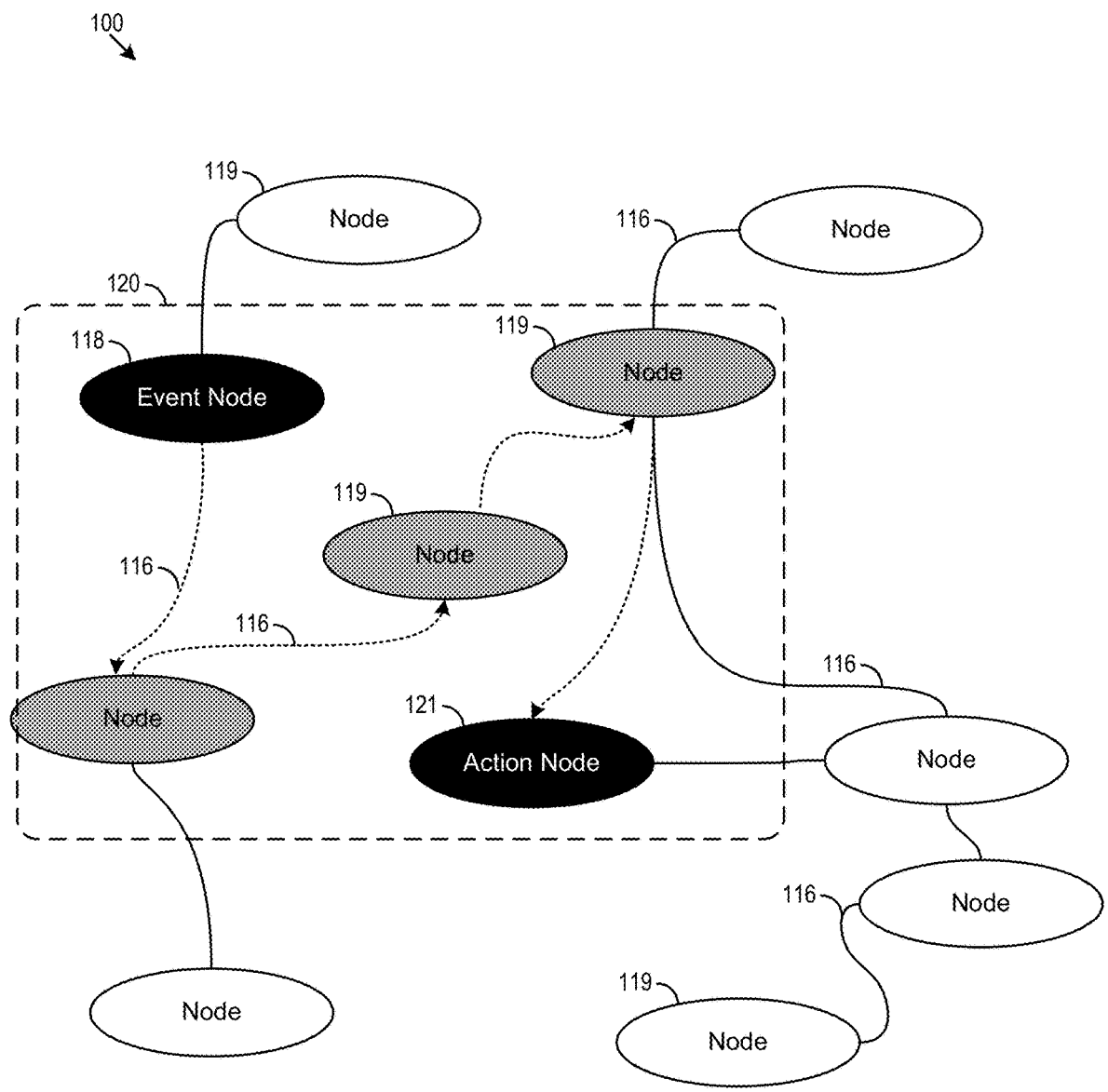
FIG. 1 shows an example knowledge layout.

FIG. 1 shows an example knowledge layout 100 with an example meta-graph extracted 120. The knowledge layout 100 used to map the operation and resources (e.g., the context) of an existing system, such as a logistics system, an oil refinery, or other, and artificial intelligence application, or other system. The knowledge layout may include nodes 119 and/or edges 116 detailing the operation (for example, inputs, outputs, resources, sensors, agents, events, actions, or other operations and/or requirements of the system). For example, the knowledge layout 100 may have nodes 118 representing events that occur and nodes 121 representing actions performed in response to those events with edges 116 inter-connecting the nodes. In the example, knowledge layout 100, the meta-graph 120 includes the nodes on the path between the event node 118 and the action node 121.

Figure 2:
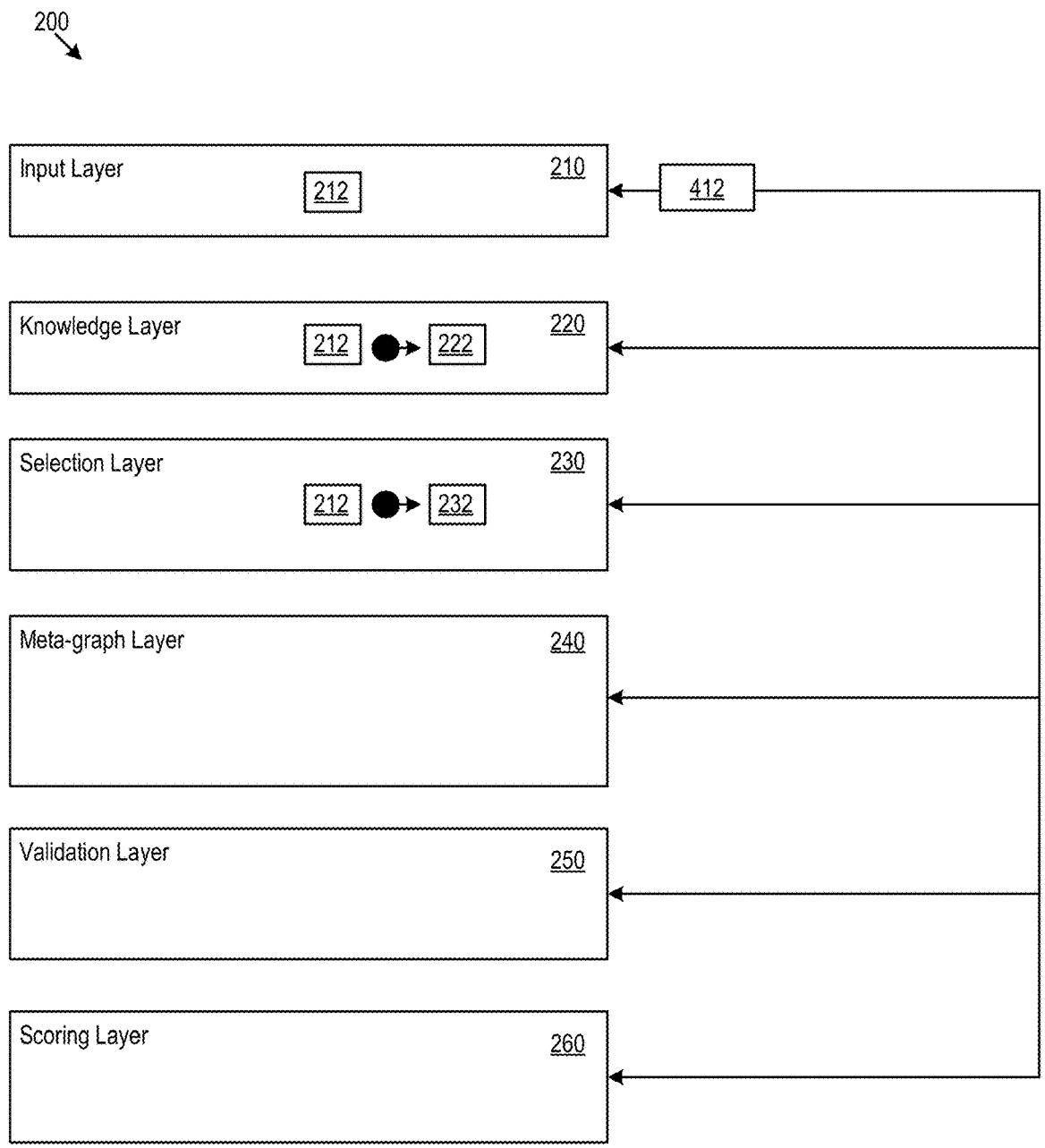
FIG. 2 shows an example event stack.

In some implementations, a multiple-layer event stack may be used to implement the meta-graph facilitated event-action pairing discussed. FIG. 2 shows an example event stack 200. The example event stack 200 may include an input layer 210, which may handle data reception (e.g., extraction, transformation, and/or loading of data); a knowledge layer 220, which may handle data, resource, and condition onboarding into the knowledge layout to support event-action paring; a selection layer 230, which may handle action selection inputs; a meta-graph layer 240 which may handle meta-graph extraction and/or merging from the knowledge layout; a validation layer 250, which may handle presentation of meta-graph validation options; and/or a scoring layer 260 which may handle meta-graph scoring and ranking.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the event stack 200, the input layer 210 may provide the knowledge layer 220 with network interface circuitry resources for data access support, e.g., by sending or otherwise providing an interface over a hardware network architecture. Hence, the input layer 210 may provide a hardware resource, e.g., network interface circuitry resources, to the knowledge layer 220. Accordingly, the multiple-layer stack architecture of the event stack 200 may improve the functioning of the underlying hardware.

Figure 3:
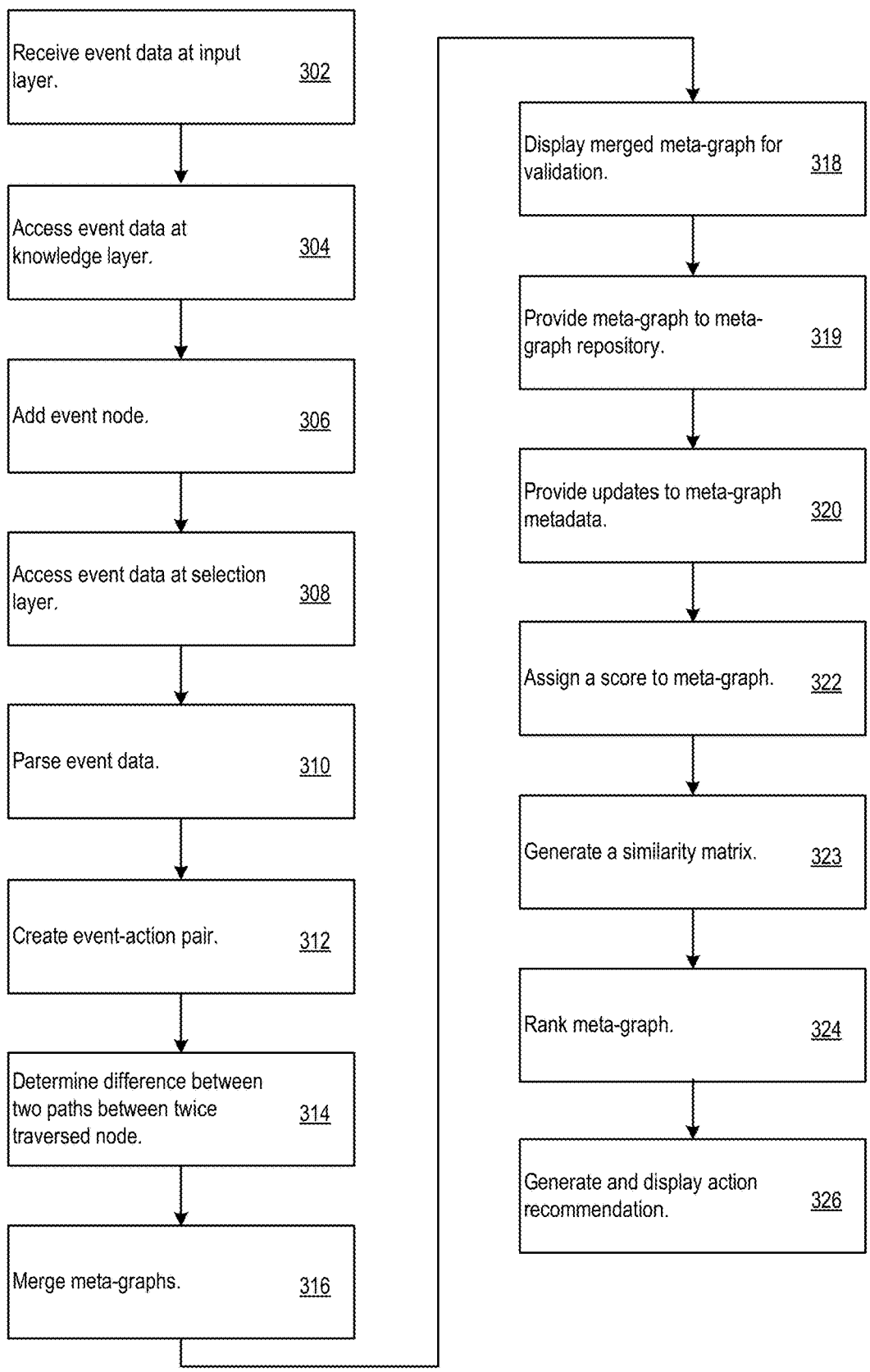
FIG. 3 shows example event logic.

Referring now to FIG. 3 (while continuing to refer to FIG. 2), example event logic 300, which may be used to control the operation and implementation of the event stack 200 on event circuitry, is shown. The event logic 300 may, at the input layer 210 of the event stack 200, receive (e.g., via network interface circuitry such as the communication interfaces 412 discussed below) event data 212 associated with an event (302).

The event logic 300 may, at the knowledge layer 220 of the event stack 200, access the event data (304). For example, the access at the knowledge layer 220 may be facilitated via a memory or network hardware resource provided by the input layer 210. The event data 212 may, in describing the set of conditions defining the event, detail various attributes of the event. Based on the detailed attributes, the event logic (e.g., at the knowledge layer 220) may add an event node 222 to a knowledge layout that represents the event (306). In some cases, the event may include an active event in which the detailed conditions and/or attributes a currently occurring. However, in some cases, the system may be used to develop recommended actions to response to past events and/or events that have not yet occurred.

At the selection layer 230, the event logic 300 may access the event data (308). For example, the access at the selection layer 230 may be facilitated via a memory or network hardware resource provided by the input layer 210. The event logic 300 may parse the event data 212 to determine event phrases 232 (310). The event phrases 232 may include various semantic descriptions (or portions thereof that may include one or more terms) of the event. The event phrases may have relationships (e.g., semantic relationships to actions and/or actions nodes representing actions). Based on the event phrases, the event logic 300 may (at the selection layer) obtain a selection of the action to create an event-action pair between the event node and an action node representing the selected action (312). For example, the event logic 300 may present a group of one or more actions with nodes on the knowledge layout to a display interface for selection of an action from among the presented actions. The event logic may present the event phrases along with the displayed actions to facilitate the selection. In some implementations, the event logic 300 may include an indication of the level of (e.g., semantic) match between an event and action in the selection display. In some implementations, the event logic 300 may include a display of related event phrases for each displayed action. In some cases, the event logic may include all actions represented on a knowledge layout. In some cases, the event logic 300 may curate the available options by requiring some relationship metric (e.g., top X closest relationships (where X is a predetermined positive integer), threshold level of relationship, threshold number of event phrases related to action, or other metric) to be included among the options. Additionally or alternatively, the order of presentation of displayed action options may be determined via ranking relationships.

In some implementations, the event logic 300 may determine the group of actions to present to the display interface for selection by performing a query on the knowledge layout. For example, the event logic 300 may use the event phrases as query inputs to locate nodes representing actions and/or nodes related to actions. In some cases, the query may be constrained to a specific group of action nodes. For example, upon placement in the knowledge layout, the event node may be connected (e.g., via an edge) to a type node that defines a 'type' for the event. The type node may have existing (or automatically populated) connections to action, e.g., actions previously used or recommended for event with the same type as the event that is newly place in the knowledge layout. Accordingly, in some cases, the query may be constrained to these actions represented by nodes with existing connections (which may be direct one-hop connections or, in some cases, may be intermediated by one or nodes between the type node and the action node). In some cases, the query may specify the allowed number of intervening nodes between the event node and the action node. In some cases, the event logic 300 may identify the type node by traversing the knowledge layout outward from the event node to the type node.

At the meta-graph layer 240, the event logic 300 may identify multiple paths (e.g., portions of the knowledge layout) that have the event and selected action as end points. These portions of the knowledge layout may be referred to as meta-graphs. For an event-action pair, there may be multiple paths leading from the event to the action. The event logic may capture multiple ones of these available paths. For example, the event logic 300 may capture every distinct path below a certain length. In an example, the event logic 300 may capture the Y shortest distinct paths (where Y is a predetermined positive integer). In some examples, the event logic 300 may employ a meta-graph creation and/or extraction algorithm (e.g., such as a greedy meta-graph creation algorithm) to identify paths between the event and action nodes. Upon traversing distinct paths (314), the event logic 300 may determine that two paths differ by a portion where one of the paths crosses the same node twice (in some cases crossing other nodes between the two crossings) but may be same outside of that portion. In various implementations, the portion may include one or more nodes. In some cases, the node that is traversed twice may be the event or the action node. However, in some cases, the twice-traversed node may include a node on the paths between the event node and action node. In some implementations, the event logic 300 may merge two meta-graphs (316) that differ in this way. In other words, the event logic 300 may merge two paths where one of the paths crosses the same node twice (in some cases crossing other nodes between the two crossings) but the paths are otherwise the same outside of that portion the loop formed between the two crossing of the same node.

At the validation layer 250, the event logic 300 may present the first path (first meta-graph) on a display interface for validation (318). In various implementations, a user may review the merged meta-graph, event-action pair, scoring information (see below), event phrases, or other information to make a validation determination regarding the meta-graph. Where a meta-graph constitutes a linkage between an event and plausible action (to be taken in response) the user may initiate validation of the meta-graph. In some cases, the validation process may act as training for selection/scoring layer operations of the event logic 300. Input at the validation layer may shape future determinations by the event logic 300 through the adjustment of scoring, meta-graph generation algorithms, or other operations.

In various implementations, the event logic 300, may, at the validation layer 250, provide a validated meta-graph to a meta-graph repository (319) for inclusion as an entry. The meta-graph repository may include metadata for the meta-graphs including scoring data and/or meta-graph rank. When the score and/or rank for a meta-graph changes the event logic 300 may provide updates to the metadata in the meta-graph repository (320).

At the scoring layer 260, the event logic 300 may assign a score to the merged meta-graph (322). The score may be based on a similarity matrix determined based on the sequence nodes within the meta-graph. Accordingly, the event logic 300 may generate the similarity matrix (323, e.g., for determination of the score). Based on the score and/or validation input from the user, the event logic 300 may rank the merged meta-graph in relation to other meta-graphs (324). The event logic 300 may also generate a recommendation to perform the action represented by the action node at the end of the meta-graph in response to the event. The event logic may display the recommendation on the display interface used for validation (326).

The similarity matrix may be based on an adjacency of nodes within a knowledge layout and one or more events that may be traced as intervening nodes within the meta-graph being scored. The sequence of the nodes and the relationships of the events to actions may define the entries of the adjacency matrix. Entries in the adjacency matrix may be '1' when nodes are adjacent and '0' otherwise. In various implementations, the similarity matrix may be determined by computing the commutation matrix of the adjacency matrix. The row of the N×M similarity matrix may define N events which a related via the entries to M actions which form the columns. The similarity matrix may include a low-density matrix (e.g., a matrix with many entries containing '0') that may be decomposed into two low rank matrices (and N×F matrix and an F×M matrix). The low rank matrices relate the N events and M actions to a set of F features for extraction. The 'vertical' N×F matrix relates the N events to the F features via its entries and the 'horizontal' F×M matrix relates the F features the M actions. In the example, N, F, and M are positive integers.

Figure 4:
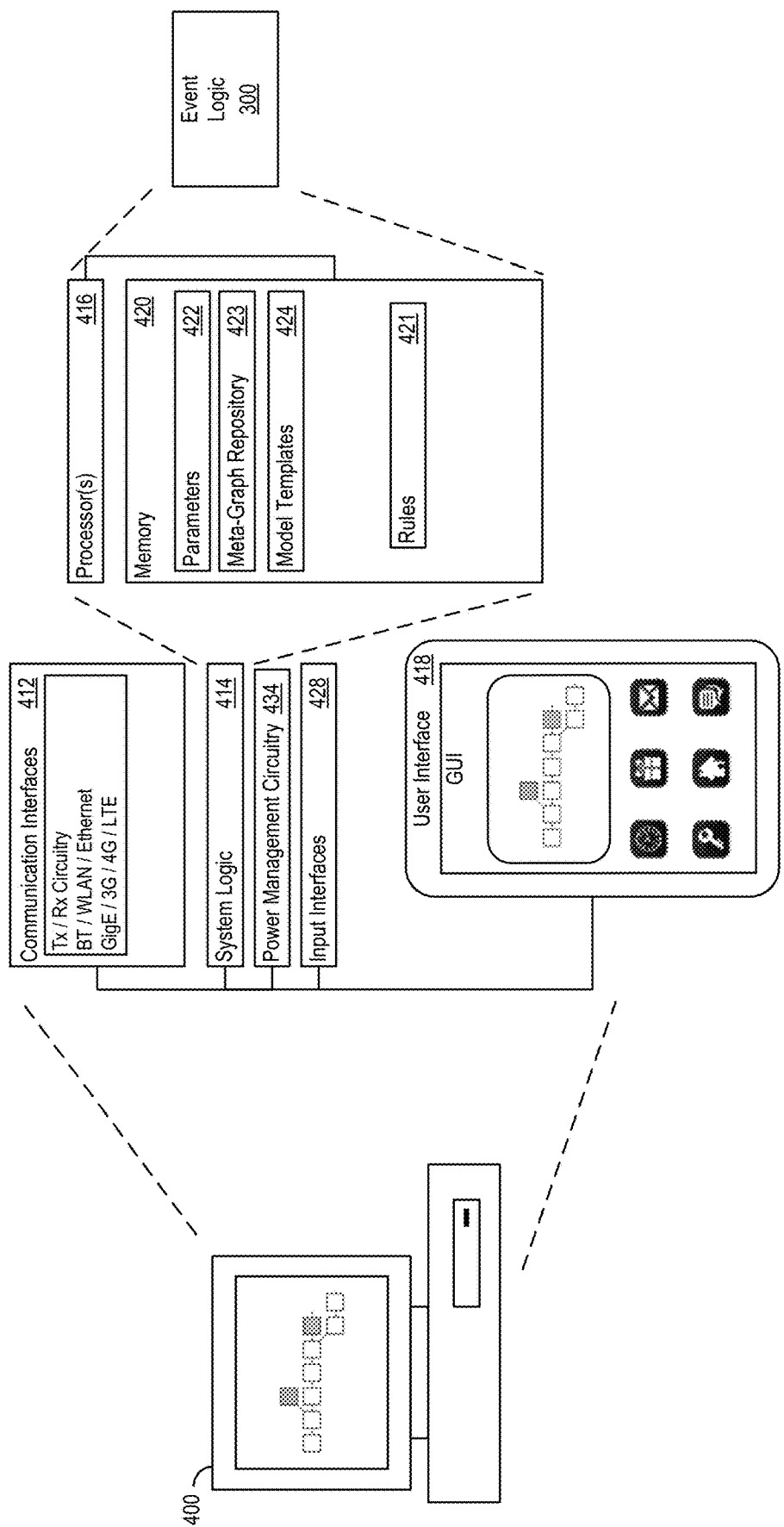
FIG. 4 shows an example execution environment for the event logic.

FIG. 4 shows an example execution environment (EE) 400 for implementing the event logic 300. The EE 100 may include system logic 414 to support tasks described in the disclosure, including the drawings and/or claims. The system logic 414 may include processors 416, memory 420, and/or other circuitry, which may be used to implement event logic 300, which may provide software support to implement the various tasks performed by the system. Accordingly, the system logic 414 may act as the event circuitry in various implementations.

The memory 420 may be used to store parameters 422 and/or model templates 424 used in the event analysis. The memory 420 may further store selection rules 421, that may facilitate selection of actions and/or event analysis. The memory may include a meta-graph repository 423 (and/or database interactions instructions/protocols for support of such a repository on a database)

The memory 420 may further include applications and structures, for example, coded objects, templates, or one or more other data structures to support action selection and event response. The EE 400 may also include one or more communication interfaces 412, which may support wireless, e.g. Bluetooth, Wi-Fi, WLAN, cellular (3G, 4G, LTE/A, NR, or other cellular standards), and/or wired, ethernet, Gigabit ethernet, optical networking protocols. The communication interface 412 may support communication, e.g., through the input layer as network interface circuitry, with data sources or resources used to invoke selected action or other parties to facilitate operation of the system. Additionally or alternatively, the communication interface 412 may support secure information exchanges, such as secure socket layer (SSL) or public-key encryption-based protocols for sending and receiving private data. The EE 400 may include power management circuitry 434 and one or more input interfaces 428.

The EE 400 may also include a user interface 418 that may include man-machine interfaces and/or graphical user interfaces (GUI). For local operation, the GUI may act as the display interface discussed above. However, in various distributed systems, the display interface may be generated on a remote terminal or device. GUI may be used to present interfaces and/or options to operators involved in actions responding to events.

Example Implementation

Figure 5:
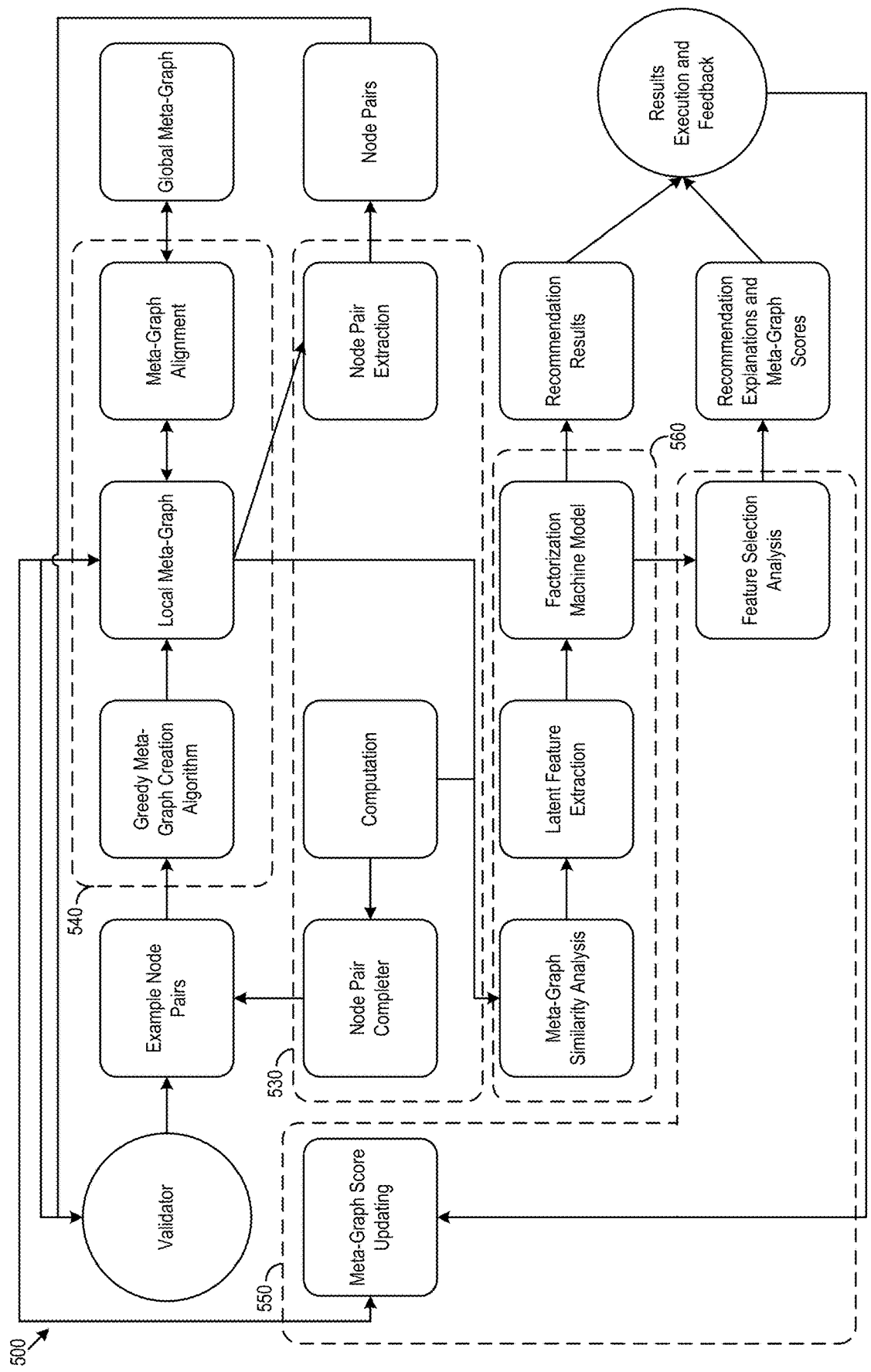
FIG. 5 shows example event-action logic.

FIG. 5 shows example event-action pairing logic 500. In the example event-action pairing logic 500, the selection 530, meta-graph 540, validation 550, and scoring 560 layers may perform various example operations. Table 1 provides descriptions of the various example operations.

TABLE 1

Example Event-Action Logic Operations

| Operation | Description | Layer | Input | Output |
|---|---|---|---|---|
| Greedy Meta-graph Creation Algorithm | Creating the meta-paths based on the state-of-the-art algorithms which works with initial inputs and feedbacks from the SME. The paths are merged together into graphs, if they have two nodes that are identical with only one differing node in the middle. | Meta-graph | (1) Human-expert initial node pairs (2) Human-expert accepting/rejecting generated node pairs | Local meta-graphs |
| Meta-graph Alignment | Collect meta-graphs from the generated library and align it with the meta-graph libraries generated upon other knowledge layout schemas using the ontology alignment tools and schema matching approaches such as, Karma and Silk. | | External and internal libraries of meta-graphs | United library of meta-graphs (local and global meta-graphs are updated) |
| Node Pair Extraction | Extract the instances related to the source and target node of the meta-graph via graph queries. | Selection | United library of meta-graphs | Similar node pair instances |
| Node Pair Completer | Suggest a matching node for faster node pair initial input based on querying the graph for the instances of type target node that are previously linked to the instances of source node type. | | Single source node instance | Target node instances |
| Meta-graph Similarity Analysis | Compute the similarities between the source and target node of all the meta-graphs via a counting-based similarity analysis. | Scoring | Instances associated with each meta-graph | Commuting matrices |

TABLE 1-continued

Example Event-Action Logic Operations

| Operation | Description | Layer | Input | Output |
|---|---|---|---|---|
| Latent Feature Extraction | Using the state-of-the-art matrix factorization techniques to transform the sparse commuting matrices of each meta-graph to two low rank matrices. | | Commuting matrices for each meta-graph | Decomposed and dense feature matrices |
| Factorization Machine Model | Model training and rating calculation for the final recommendation result. | | Combined latent features across all the meta-graphs | (1) Optimized feature weights (2) Entity ratings |
| Feature Selection Analysis | Provide explained recommendations based on analyzing the feature values and weights for each meta-graph. | Validation | (1) Selected rating (2) Meta-graph weights and features | Ranked meta-graphs and scores for the current recommendation in a visualized format |
| Meta-graph Score Updating | Update the united library of meta-graphs with scores sampled from the current recommendations and the chosen recommendation and the scores already associated with each meta-graph in the repository. | | Ranked meta-graphs and scores for the recommendations and selected recommendation | Ranked meta-graphs and scores for saving in the meta-graph repository |

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A method including:
at an input layer of an event stack receiving event data associated with an event;
at a knowledge layer of the event stack:
accessing the event data from the input layer; and
adding an event node to a knowledge layout based on attributes of the event detailed within the event data, the event node representative of the event;
at a selection layer of the event stack:
accessing the event data from the input layer;
parsing the event data to determine event phrases;
based on the event phrases, obtaining a selection of an action to create an event-action node pair, the action having an existing action node on the knowledge layout;
at a meta-graph layer of the event stack:
identifying, using a path creation algorithm, a first path and a second path from the event to the action on the knowledge layout;
traversing the knowledge layout from the event to the action over the first path and the second path;
merging the second path and into the first path based on two traversals of a specific node along the second path, the first path traversing the specific node once, the first path identical to the second path except for a portion between the two traversals of the specific node;

at a validation layer of the event stack and after merging, presenting the first path on a display interface for validation;
at a scoring layer of the event stack:
assigning a score to the first path based on the validation;
determining a rank for the first path relative to a third path based on the score;
generating a recommendation to respond to the event using the action based on the rank; and
causing a presentation of the recommendation on the display interface.

2. The method of claim 1, where obtaining the selection of an action includes receiving a user-input response to an option to select the action generated based on the event phrases.

3. The method of claim 2, where generation of the option includes performing a query on the knowledge layout based on the event phrases.

4. The method of claim 3, where the query is constrained to actions with an existing link to a type of the event node.

5. The method of claim 4, where the query further includes traversing the knowledge layout from the event node to a type node linked to the event node.

6. The method of claim 1, where the first path, the second path, and the third path include meta-graphs of the knowledge layout.

7. The method of claim 1, where:
the second path traverses one or more nodes between the two traversals of the specific node; and
the specific node is different from the event node, the existing action node, or both.

8. The method of claim 1, further including recording the first path as an entry within a meta-graph repository after merging the first path and second path.

9. The method of claim 8, further including updating a score of the entry, a rank of the entry, or both responsive to activity at the scoring layer.

10. The method of claim 1, further including, at the scoring layer, generating a similarity matrix for a group of events including the event, the similarity matrix generated based on a sequence of nodes defined by the first path.

11. The method of claim 10, where generating the similarity matrix include computing a commutation matrix for an adjacency matrix the sequence of nodes.

12. The method of claim 11, further including determining the adjacency matrix by identifying adjacent nodes along the first path.

13. A system including:
memory including instructions; and
event circuitry including a processor, the event circuitry, when executing the instructions, configured to:
at an input layer of an event stack receiving event data associated with an event;
at a knowledge layer of the event stack;
access the event data from the input layer; and
add an event node to a knowledge layout based on attributes of the event detailed within the event data, the event node representative of the event;
at a selection layer of the event stack:
access the event data from the input layer;
parse the event data to determine event phrases;
based on the event phrases, obtain a selection of an action to create an event-action node pair, the action having an existing action node on the knowledge layout;
at a meta-graph layer of the event stack:
identify, using a path creation algorithm, a first path and a second path from the event to the action on the knowledge layout;
traverse the knowledge layout from the event to the action over the first path and the second path;
merge the second path and into the first path based on two traversals of a specific node along the second path, the first path traversing the specific node once, the first path identical to the second path except for a portion between the two traversals of the specific node;
at a validation layer of the event stack and after merging, presenting the first path on a display interface for validation;
at a scoring layer of the event stack:
assign a score to the first path based on the validation;
determine a rank for the first path relative to a third path based on the score;
generate a recommendation to respond to the event using the action based on the rank; and
cause a presentation of the recommendation on the display interface.

14. The system of claim 13, where the event circuitry is further configured to obtain the selection of an action by receiving a user-input response to an option to select the action generated based on the event phrases.

15. The system of claim 14, where the event circuitry is further configured to generate the option by performing a query on the knowledge layout based on the event phrases.

16. The system of claim 15, where the query is constrained to actions with an existing link to a type of the event node.

17. The system of claim 16, where the event circuitry is further configured to execute the query by traversing the knowledge layout from the event node to a type node linked to the event node.

18. A product including:
machine-readable media other than a transitory signal; and
instructions stored on the machine-readable media, the instructions, when executed configured to cause a machine to:
at an input layer of an event stack receiving event data associated with an event;
at a knowledge layer of the event stack;
access the event data from the input layer; and
add an event node to a knowledge layout based on attributes of the event detailed within the event data, the event node representative of the event;
at a selection layer of the event stack:
access the event data from the input layer;
parse the event data to determine event phrases;
based on the event phrases, obtain a selection of an action to create an event-action node pair, the action having an existing action node on the knowledge layout;
at a meta-graph layer of the event stack:
identify, using a path creation algorithm, a first path and a second path from the event to the action on the knowledge layout;
traverse the knowledge layout from the event to the action over the first path and the second path;
merge the second path and into the first path based on two traversals of a specific node along the second path, the first path traversing the specific node once, the first path identical to the second path except for a portion between the two traversals of the specific node;

at a validation layer of the event stack and after merging, presenting the first path on a display interface for validation;

at a scoring layer of the event stack:
assign a score to the first path based on the validation;
determine a rank for the first path relative to a third path based on the score;
generate a recommendation to respond to the event using the action based on the rank; and
cause a presentation of the recommendation on the display interface.

19. The product of claim 18, where the first path, the second path, and the third path include meta-graphs of the knowledge layout.

20. The product of claim 18, where:
the second path traverses one or more nodes between the two traversals of the specific node; and
the specific node is different from the event node, the existing action node, or both.

* * * * *